United States Patent [19]

Stringfellow et al.

[11] Patent Number: 4,872,986

[45] Date of Patent: Oct. 10, 1989

[54] USE OF BACTERIA FOR CONTROL OF ALGAL BLOOM IN WASTEWATER, LAGOONS, OR PONDS

[75] Inventors: William T. Stringfellow, Atlanta, Ga.; Charles D. Goldsmith, Christiansburg; Lois T. Davis, Salem, both of Va.

[73] Assignee: Sybron Chemicals, Inc., Birmingham, N.J.

[21] Appl. No.: 191,073

[22] Filed: May 6, 1988

[51] Int. Cl.$^4$ ................................................ C02F 1/50
[52] U.S. Cl. ..................................... 210/611; 210/764; 71/67; 435/253.3; 435/874; 435/875; 435/877
[58] Field of Search ............... 210/602, 610, 611, 764; 71/67; 435/253.3, 257, 874–877

[56] References Cited

U.S. PATENT DOCUMENTS

| | | | |
|---|---|---|---|
| 2,574,070 | 11/1951 | Strawinski | 195/3 |
| 3,069,325 | 12/1962 | Hitzman | 195/3 |
| 3,143,543 | 8/1964 | Mazur | 260/239.3 |
| 4,065,875 | 1/1978 | Sina | 47/1.4 |
| 4,199,444 | 4/1980 | Blair et al. | 210/11 |
| 4,391,887 | 7/1983 | Baumgarten | 210/611 X |
| 4,402,971 | 9/1983 | Edwards | 424/279 |
| 4,447,539 | 5/1984 | Pillis et al. | 435/253 |
| 4,452,894 | 6/1984 | Olsen et al. | 435/253 |
| 4,478,683 | 10/1984 | Orndorff | 162/161 |
| 4,482,632 | 11/1984 | Spraker | 435/253 |
| 4,483,923 | 11/1984 | Blair | 435/253 |
| 4,511,657 | 4/1985 | Colaruotolo et al. | 210/611 |
| 4,562,156 | 12/1985 | Isbister | 435/253 |
| 4,595,505 | 6/1986 | Dor | 210/602 |
| 4,655,794 | 4/1987 | Richardson | 51/293 |
| 4,803,166 | 2/1989 | Kulpa et al. | 435/253.3 |

*Primary Examiner*—Tom Wyse
*Attorney, Agent, or Firm*—Marjama & Pincelli

[57] ABSTRACT

A process for controlling algal growth in wastewater, lagoons and ponds which comprises treating the algae containing water with a high concentration of a selected actively growing species of pseudomonas product which products an exudate which exhibits antialgal characteristics.

4 Claims, No Drawings

4,872,986

USE OF BACTERIA FOR CONTROL OF ALGAL BLOOM IN WASTEWATER, LAGOONS, OR PONDS

BACKGROUND OF THE INVENTION

Algal growth in water can result in poorly settling solids and effluent solid violations. Further, this algal growth which commonly occurs in wastewater, lagoons, livestock watering ponds, reservoirs and other bodies of water can result in degradation of water quality, and thus limit the uses of the affected body of water.

SUMMARY OF THE INVENTION

The purpose of the present invention is to develop organisms for use in the control of algae. More specifically, the invention is directed to the use of bacterial exudates which are useful in the control of algae. It has been discovered that certain of Pseudomonas species produce exudates containing pigments which have been recorded in the literature as having antibiotic and antialgal properties. The objective of the present invention is to culture and grow Pseudomonas cultures in media that enhance the production of pigments, and pigment associated compounds, and use these materials to inhibit the growth of algae in lagoons and other bodies of water affected by algal growth.

DETAILED DESCRIPTION OF THE INVENTION

Selected strains of *Pseudomonas aeruginosa*, *Ps. stutzeri*, and *Ps. putida* have been tested and shown to produce exudates which inhibit fresh water algae. These bacteria, when grown on a glycerine based media, produce a supernatant which is inhibitory at concentrations of 10 percent or less (by volume) to a wide range of algae. Media modification and strain selection will allow improvements of this activity.

A sample of lagoon water was collected at Myrtle Beach, S.C. on Feb. 10, 1987 for examination purposes. The sample was identified as containing green algae, blue-green algae, Euglena and diatoms. Green algae were predominant. Attached Table 1 lists the algae identified in the Myrtle Beach lagoon sample. Predominant species are marked with a plus (+) sign.

Algal cultures were acquired from the University of Texas collection for testing. Some species would not culture on plates or in liquid media, and therefore, could not be assayed in all tests. A list of the acquired species is presented in attached Table 2.

A first series of tests was conducted which constitute qualitative tests on double-sided culture plates. The test series was conducted to screen twelve strains of bacteria against nine species of algae. In this test algae were spot-inoculated onto one side of a double-sided petri dish and allowed to grow to colonies approximately 10 mm in diameter.

TABLE 1

| Algal Species Identified in Myrtle Beach Lagoon Water Sample | |
|---|---|
| Sample Collected - 2/10/87 - Myrtle Beach Observation - 2/18/87 | |
| | Predominant (+) |
| Greens | |
| Actinastrum hantzschii | + |
| Ankistrodesmus falcatus | + |
| Ankistrodesmus convolutus | |

TABLE 1-continued

| Algal Species Identified in Myrtle Beach Lagoon Water Sample | |
|---|---|
| Sample Collected - 2/10/87 - Myrtle Beach Observation - 2/18/87 | |
| | Predominant (+) |
| Chlamydomonas sp. | |
| Chlorella sp. | + |
| Golenkinia radiata | |
| Micractinium pusillum | |
| Oocystis sp | |
| Scenedesmus acuminatus | + |
| S. acutiformis | |
| S. dimorphus | + |
| Blue-Greens | |
| Merismopedia punctata | |
| Microcystis sp. | |
| Phormidium sp. | |
| Euglenoids | |
| Euglena sp. | |
| Diatoms | |
| Stephanodiscus cp. | |

TABLE 2

Algal Species Acquired from the University of Texas Culture Collection Which Were Used for Qualitative Toxicity Assays

| LIST OF ALGAL SPECIES FOR QUALITATIVE EVALUATION OF INHIBITION |
|---|
| Scenedesmus dimorphus (UTEX 417) |
| Scenedesmus acuminatus (UTEX 415) |
| Scenedesmus acutiformis (UTEX 416) |
| Chorella pyrenoidosa (UTEX 26) |
| Ankistrodesmus falcatus (UTEX 479) |
| Synechococcus leopoliensis (UTEX 625) |
| Phormidium autumnale (UTEX 1580) |
| Oscillatoria tenuis (UTEX 1566) |
| Anabaena flos-aquae (UTEX 1444) |
| ADDITIONAL ALGAL SPECIES NOT IN FULL CULTURE |
| Euglena gracilis (UTEX 369) |
| Chlorella vulgaris (UTEX 29) |
| Actinastrum hantzschii (UTEX LB605) |
| Microcystis aeruginosa (Utex LB1939) |

The bacteria were then inoculated on the other side of the petri dish so that they formed a lawn. As the bacteria grew, algal colony size was measured. Reduction in colony size in relation to controls was indicative of toxicity.

In a second test series, supernatants from selected bacterial strains were harvested and tested for chemical inhibition of algae. Methods used for qualitative tests were derived from procedures in "Algal Acute Toxicity Tests, Office of Pesticides and Toxic Substances", USEPA EG-8, August, 1982. This is standard test protocal published by USEPA to test the effects of chemicals on algae, and is incorporated herein by reference. The procedure was modified to allow testing of supernatants and wider variety of algae. In both tests Pseudomonas were grown on Kings B Media. The composition of this media is tabulated below.

| Kings B Media | |
|---|---|
| Proteose peptone | 20.0 g |
| Glycerine | 10.0 g (7.9 ML) |
| K$_2$HPO$_4$ | 1.14 g |
| MgSO$_4$ | 1.17 g |
| Agar | 15.0 g |
| Distilled water | 1,000 ML |

Ajust pH to 7.2–74. Heat to boiling to dissolve Agar. Dispense 100 ML in dilution bottles. Autoclave 30 min. at 121° C.

Broth: make as above without agar, dispense 100 ML each into 250 ML flasks.

The results of the qualitative tests are presented in Tables 3, 4 and 5. Table 3 lists algal colony sizes prior to bacterial inoculation. Three algal species, *Phormidium autumnale*, *Anabaena flos-aquae* and *Oscillatoria tenuis* did not have significant growth either before or after bacterial inoculation.

One week after bacterial inoculation (Table 4) algal colony size was reduced in many cases. *Ankistrodesmus falcatus* and *Scenedesmus acutiformis* appeared to be the most sensitive to bacterial inhibition. *Synechococcus leopoliensis* and *Scenedesmus acuminatus* appeared to be less sensitive. *Scenedesmus dimorphus* and *Chlorella pyrenoidosa* are the most resistant.

After two weeks (Table 5) all algal species tested showed some sensitivity to three or more bacteria. *Pseudomonas aeruginosa* strain 2203-5 Large had the widest range of activity, inhibiting all six algal strains. Three other *Ps. aeruginosa* (strains sulfur, 2204 and 4-5-14) and one *Ps. putida* (strain 1738) also exhibited some toxicity against at least one of the more resistant algae. 1738 is a product available from Sybron Chemicals Inc. under the tradename Bichem DC 1738 CW and consists of a mixture of *Pseudomonas putida, Ps. aeruginosa* and *Ps. stutzeri*. Toxicity appears to be related to the production of dark green pigmentation.

For the quantitative testing, four strains of algae were chosen. Two algae *Scenedesmus dimorphus* and *Chlorella pyrenoidosa*, were selected for their resistance. *Ankistrodesmus falcatus* was selected as a sensitive algae. *Anabaena flos-aquae* was also tested because it is a common algal genus and had not been previously tested. The three bacterial strains 1738, 4-5-14 and 2203-5-Large were selected for further testing based on results of the qualitative assays.

Table 6 contains the summary of results of the initial qualitative assays. The results of three supernatant concentrations are presented in tabular form. Cell counts from treated samples were divided by cell counts from control samples, to give cell counts as a fraction of the control. Numbers above 1.00 are indicative of stimulation and below 1.00 are indicative of toxicity.

These results support the conclusion that there is a toxic material in the bacterial supernatant, and that algal inhibition could result from factors other than just nutrient competition. Lower concentrations of supernatant results in the stimulation of algae, which is a standard response to low level toxic materials. At higher concentrations, inhibition of algal counts is dramatic. There is considerable variation in the responses depending on both algae and bacteria. *Scenedesmus dimorphus* appears to be the most resistant algae tested. *Pseudomonas* strains 4-5-14 and 2203-5-Large appear to be more toxic than strain 1738. All algae tested were inhibited by at least one strain of bacteria at the supernatant concentration between about 3 and 10 percent.

The results above demonstrate that Pseudomonas strains in our culture collection produce exudates that are toxic to a wide selection of fresh water algae. Of the bacterial strains tested, P. sulfur, 2203-5-Large, 2204, 4-5-14 and 1738 appear to be the best toxin producers. All of the strains are identified as Pseudomonas aeruginosa, except strain 1738 which is identified as Pseudomanas putida.

TABLE 3

Algal Colony Sizes (mm) Prior to Bacterial Innoculation

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | CONTROLS 1 | 2 | 3 |
|---|---|---|---|---|---|---|---|---|---|---|---|---|---|---|---|---|---|---|---|---|---|---|---|---|---|---|---|
| *Scenedesaus acuminatus* | X | 11 | 10 | 10 | X | X | 9 | 10 | X | 9 | 13 | 11 | 10 | 14 | 12 | 10 | 12 | X | 13 | 12 | 10 | 10 | 10 | 11 | 15 | 8 | 14 |
| *Scenedesaus dimorphus* | 10 | 11 | 11 | 10 | 8 | 10 | 13 | 10 | 10 | 9 | 12 | 12 | 11 | 13 | 12 | 12 | 10 | X | 10 | 13 | 10 | 9 | 10 | 10 | 14 | 8 | 16 |
| *Chlorella pyrenoidosa* | 10 | 10 | 9 | 10 | 10 | 10 | 10 | 10 | 9 | 8 | 9 | 11 | 11 | 11 | 9 | 12 | 8 | 13 | 14 | 13 | 10 | 9 | 10 | 12 | 9 | 11 | 12 |
| *Ankistrodesmus falcatus* | 9 | 7 | X | 11 | 9 | 10 | 10 | 9 | 10 | X | 10 | 10 | 8 | 10 | 7 | 10 | 11 | 10 | 10 | 11 | 11 | 10 | 9 | 10 | 9 | 7 | 10 |
| *Phormidiua autumnale* | X | X | X | X | X | X | X | X | X | X | X | X | X | X | X | X | X | X | 1 | X | X | X | X | X | X | X | X |
| *Anabaena flos-aquae* | X | X | X | X | X | X | X | X | X | X | X | X | X | X | X | X | 2 | X | X | X | X | X | X | X | X | X | X |
| *Oscillatoria tenuis* | X | X | X | X | X | X | X | X | X | X | X | X | X | X | X | X | X | X | X | X | X | X | X | X | X | X | X |
| *Synechococcus leopoliensis* | 10 | 11 | 11 | 9 | 10 | 11 | 14 | 2 | 10 | 10 | 10 | 9 | 9 | 10 | 10 | 4 | 10 | 10 | 10 | 10 | 9 | 13 | 11 | 12 | 10 | 9 | 10 |
| *Scenedesmus acutiformis* | 8 | 9 | 12 | 9 | 11 | 10 | 10 | 2 | 9 | 11 | 10 | 10 | 10 | 8 | 10 | 13 | 10 | 12 | 11 | 12 | X | 10 | 9 | 10 | 10 | 10 | 10 |

X = No algal growth

TABLE 4

Algal Colony Growth (mm) 1 Week After Bacterial Innoculation

| ALGAE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | CONTROLS 1 | 2 | 3 |
|---|---|---|---|---|---|---|---|---|---|---|---|---|---|---|---|---|---|---|---|---|---|---|---|---|---|---|---|
| 1. | X | -1 | -1 | -8 | X | X | -3 | -1 | X | -9 | -2 | -4 | 0 | -1 | -2 | -7 | -2 | X | -2 | -1 | -6 | 0 | -1 | -1 | -1 | +2 | 0 |
| 2. | 0 | 0 | 0 | -4 | +1 | 0 | -2 | -1 | -1 | -1 | 0 | 0 | -1 | -1 | -2 | 0 | -1 | X | -1 | -1 | -1 | 0 | -1 | -1 | -1 | +1 | +1 |
| 3. | +1 | +1 | X | 0 | 0 | +2 | -1 | -1 | 0 | +1 | 0 | 0 | 0 | +1 | 0 | 0 | +1 | -2 | -1 | -1 | +2 | +1 | 0 | -2 | 0 | 0 | -2 |
| 4. | -9 | -5 | X | -5 | 0 | -5 | X | -9 | 0 | X | -6 | -10 | X | -1 | +2 | -10 | -2 | -10 | -8 | -3 | -7 | -10 | -6 | -2 | -2 | -1 | X |
| 5. | X | X | X | X | X | X | X | X | X | X | X | X | X | X | X | X | X | X | 0 | X | X | X | X | X | X | X | X |
| 6. | X | X | X | X | X | X | X | X | X | X | X | X | X | X | X | X | X | X | 0 | X | X | X | X | X | X | X | X |
| 7. | X | X | X | X | X | X | X | X | X | X | X | X | X | X | X | X | -2 | X | 0 | -2 | -1 | -1 | X | X | X | X | X |
| 8. | 0 | -1 | 0 | 0 | 0 | -1 | -1 | +3 | -6 | -1 | +1 | -1 | 0 | 0 | 0 | -3 | -1 | -7 | -3 | -1 | -1 | -1 | -6 | 0 | 0 | -1 | -1 |
| 9. | -4 | -1 | -8 | -6 | 0 | -1 | -1 | -2 | -9 | 0 | -10 | -10 | -10 | +1 | -7 | -10 | -6 | -2 | -1 | -2 | X | -6 | -7 | -5 | -1 | -1 | -1 |

1 = *Scendesaus acuminatus*; 2 = *Scenedesaus dimorphus*; 3 = *Chorella pyranoidosa*; 4 = *Ankistrodesmus falcatus*; 5 = *Phormidiua autumnale*; 6 = *Anabaena flos-aquea*; 7 = *Oscillatoria tenuis*; 8 = *Sumechacoccus leopoliensis*; 9 = *Scenedesmus acutiformis*
X = No algal growth
0 = No change
Key to bacterial strains:
Plates 1,2 = B-1; Plates 3,4 = SGRR; Plates 5,6 = Toluene; Plates 7,8 = 2203-5large; Plates 9,10 = 3PMN; Plates 11,12 = o-xylene; Plates 13,14 = p-sulfur; Plates 15,16 = 2204; Plates 17,18 = 4-5-14; Plates 19,20 = 1738; Plates 21,22 = m + p-xylene; Plates 23,24 = KC

TABLE 5

Algal Colony Growth (mm) 2 Weeks After Bacterial Inoculation

| ALGAE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | CONTROLS 1 | CONTROLS 2 | CONTROLS 3 |
|---|---|---|---|---|---|---|---|---|---|---|---|---|---|---|---|---|---|---|---|---|---|---|---|---|---|---|---|
| 1. | X | −11 | −6 | −9 | X | X | −9 | −10 | X | −8 | −13 | −11 | −7 | −14 | −9 | −9 | −12 | X | −7 | −1 | −6 | −2 | −6 | −7 | −6 | +3 | −2 |
| 2. | 0 | −4 | −2 | −6 | 0 | −1 | −8 | −1 | −1 | 0 | 0 | −7 | −10 | −3 | −9 | −8 | −6 | X | −2 | −2 | −3 | −1 | −1 | −3 | 0 | +1 | −2 |
| 3. | −1 | −6 | −1 | 0 | −1 | 0 | −10 | −6 | −10 | 0 | −1 | −2 | −1 | −1 | −7 | −1 | 0 | −3 | −8 | −2 | 0 | +1 | 0 | −2 | 0 | +2 | −1 |
| 4. | −9 | −7 | X | −9 | −9 | −10 | −10 | −9 | −10 | X | −10 | X | X | X | X | −10 | −9 | −10 | −10 | −11 | −11 | −10 | −9 | −10 | −1 | 0 | +2 |
| 5. | X | X | X | X | X | X | X | X | X | X | X | X | X | X | X | X | X | X | X | X | X | X | X | X | X | X | X |
| 6. | X | X | X | X | X | X | X | X | X | X | X | X | X | X | X | X | X | X | X | X | X | X | X | X | X | X | X |
| 7. | X | X | X | X | X | X | X | X | X | X | X | X | X | X | X | X | X | X | X | X | X | X | X | X | +1 | 0 | X |
| 8. | −1 | −11 | −1 | −4 | −10 | −2 | −14 | −2 | −10 | −2 | −10 | −3 | −2 | −1 | −1 | −4 | −2 | −10 | −10 | −3 | −9 | −1 | −2 | −12 | +1 | 0 | −1 |
| 9. | −8 | −9 | −12 | −9 | −11 | −10 | −10 | −2 | −9 | −11 | −10 | −10 | −10 | −8 | −10 | −13 | −7 | −12 | −11 | −12 | X | −10 | −9 | −10 | −1 | −3 | −2 |

1 = Scendesaus acuminatus; 2 = Scenedesaus dimorphus; 3 = Chorella pyranoidosa; 4 = Ankistrodesmus falcatus; 5 = Phormidiua autumnale; 6 = Anabaena flos-aquae; 7 = Oscillatoria tenuis; 8 = Sumechococcus leopoliensis; 9 = Scenedesmus acuiformis
X = No algal growth
0 = No change
Key to bacterial strains:
Plates 1,2 = B-1; Plates 3,4 = SGRR; Plates 5,6 = Toluene; Plates 7,8 = 2203-5large; Plates 9,10 = 3PMN; Plates 11,12 = o-xylene; Plates 13,14 = p-sulfur; Plates 15,16 = 2204; Plates 17,18 = 4-5-14; Plates 19,20 = 1738; Plates 21,22 = m + p-xylene; Plates 23,24 = KC

TABLE 6

Bacterial Supernatants Concentration Effect on Algal Cell Count as a Fraction of the Control*

| Bacterial Strain | Supernatants Concentration in Algal Media | Scenedesmus dimorphus | Anabaena flos-aquae | Ankistrodesmus falcatus | Chlorella pyrenoidosa |
|---|---|---|---|---|---|
|  | 1% | 1.49 | 3.13 | NT | NT |
| 1738 | 3% | NT** | 1.77 | NT | NT |
|  | 10% | 2.24 | 0.02 | NT | NT |
| 4-15-14 | 1% | 4.82 | 2.27 | 1.73 | 3.37 |
|  | 3% | 18.05 | 0.04 | 0.53 | 1.91 |
|  | 10% | 0.21 | 0.06 | 0.02 | 0.19 |
|  | 1% | 0.33 | 1.13 | 2.93 | 4.36 |
| 2203-5 | 3% | 3.26 | 3.36 | 1.30 | 1.83 |
|  | 10% | 0.39 | 0.05 | 0.01 | 0.30 |

*Control = 1.00
**NT = Not tested

When grown in a glycerine-based media, the bacterial strains 4-5-14, 2203-5-large and 1738 were able to produce exudates which were toxic to algae when applied at concentrations between about 3 and 10 percent by volume of the original supernatant. Ps. Aeruginosa stain 2203-5-Large appears to be the most toxic of the strains tested to date. The test results suggest that toxicity may be related to the production of a green pigmentation in the bacterial media.

Although particular embodiments of the present invention have been disclosed herein for purposes of explanation, further modifications or variations thereof will be apparent to those skilled in the art to which this invention pertains.

We claim:

1. A process for controlling algal growth in waste water, lagoons and ponds which comprises treating the algae containing water with a high concentration of a selected actively growing species of pseudomonas product which produces an exudate which exhibits antialgal characteristics.

2. The process of claim 1 in which the bacterial strain is at least one of *Pseudomonas aeruginosa, Ps. stutzeri,* and *Ps. putida.*

3. The process of claim 1 in which the bacterial strains are grown in an optimal media, and the bacterial supernatant is used to treat the algae.

4. The process of claim 3 in which the supernatant is applied at a concentration of about 3 to 10 percent by volume of the algae containing water being treated.

* * * * *